(12) United States Patent
Roth et al.

(10) Patent No.: US 8,545,597 B2
(45) Date of Patent: Oct. 1, 2013

(54) METHOD FOR OPERATING A BLAST FURNACE AND BLAST FURNACE INSTALLATION

(75) Inventors: Jean-Luc Roth, Thionville (FR); Jean-Paul Simoes, Walferdange (LU)

(73) Assignee: Paul Wurth S.A., Luxembourg (LU)

(*) Notice: Subject to any disclaimer, the term of this patent is extended or adjusted under 35 U.S.C. 154(b) by 282 days.

(21) Appl. No.: 13/126,486

(22) PCT Filed: Oct. 30, 2009

(86) PCT No.: PCT/EP2009/064408
§ 371 (c)(1), (2), (4) Date: Apr. 28, 2011

(87) PCT Pub. No.: WO2010/049536
PCT Pub. Date: May 6, 2010

(65) Prior Publication Data
US 2011/0209576 A1    Sep. 1, 2011

(30) Foreign Application Priority Data

Oct. 31, 2008 (LU) .......................................... 91493
Apr. 3, 2009 (LU) .......................................... 91546

(51) Int. Cl.
*C21B 7/22* (2006.01)
*C21C 5/40* (2006.01)

(52) U.S. Cl.
USPC .............................. 75/464; 266/197; 266/154

(58) Field of Classification Search
USPC .............................. 75/464, 463; 266/154, 197
See application file for complete search history.

(56) References Cited

U.S. PATENT DOCUMENTS

| | | | |
|---|---|---|---|
| 3,884,677 A | 5/1975 | Wenzel et al. | |
| 6,478,841 B1 | 11/2002 | Faccone | |
| 2003/0024352 A1* | 2/2003 | Wolf | 75/463 |
| 2009/0274985 A1 | 11/2009 | McKnight et al. | |

FOREIGN PATENT DOCUMENTS

| | | |
|---|---|---|
| CN | 1673623 A | 9/2005 |
| GB | 1247417 | 9/1971 |
| GB | 1447404 | 8/1976 |
| JP | 49-79910 A | 8/1974 |
| WO | 9935294 A1 | 7/1999 |

OTHER PUBLICATIONS

P. Corte, "High-temperature gasification of carbonaceous materials by flash pyrolysis: thermal aspects", Fuel, Aug. 1987, vol. 66, pp. 1107-1114.
International Search Report PCT/EP2009/064408; Dated Mar. 30, 2010.
Japanese Office Action issued May 15, 2013 re: JP application No. P2011-533748; citing: JP 49-079910 A and WO 99/35294 A1.

* cited by examiner

*Primary Examiner* — Scott Kastler
(74) *Attorney, Agent, or Firm* — Cantor Colburn LLP

(57) ABSTRACT

A method for operating a blast furnace and a corresponding blast furnace, the method including recovering top gas from the blast furnace, submitting at least a portion of the top gas to a recycling process, and feeding the recycled top gas back into the blast furnace, where the recycling process includes feeding the recovered top gas to a reformer unit, feeding volatile carbon containing material to the reformer unit, proceeding to flash gasification of the volatile carbon containing material in the reformer unit, at a temperature between 1100 and 1300° C., and thereby producing devolatized carbonaceous material and synthesis gas, and allowing the devolatized carbonaceous material and synthesis gas to react with the recovered top gas.

19 Claims, 1 Drawing Sheet

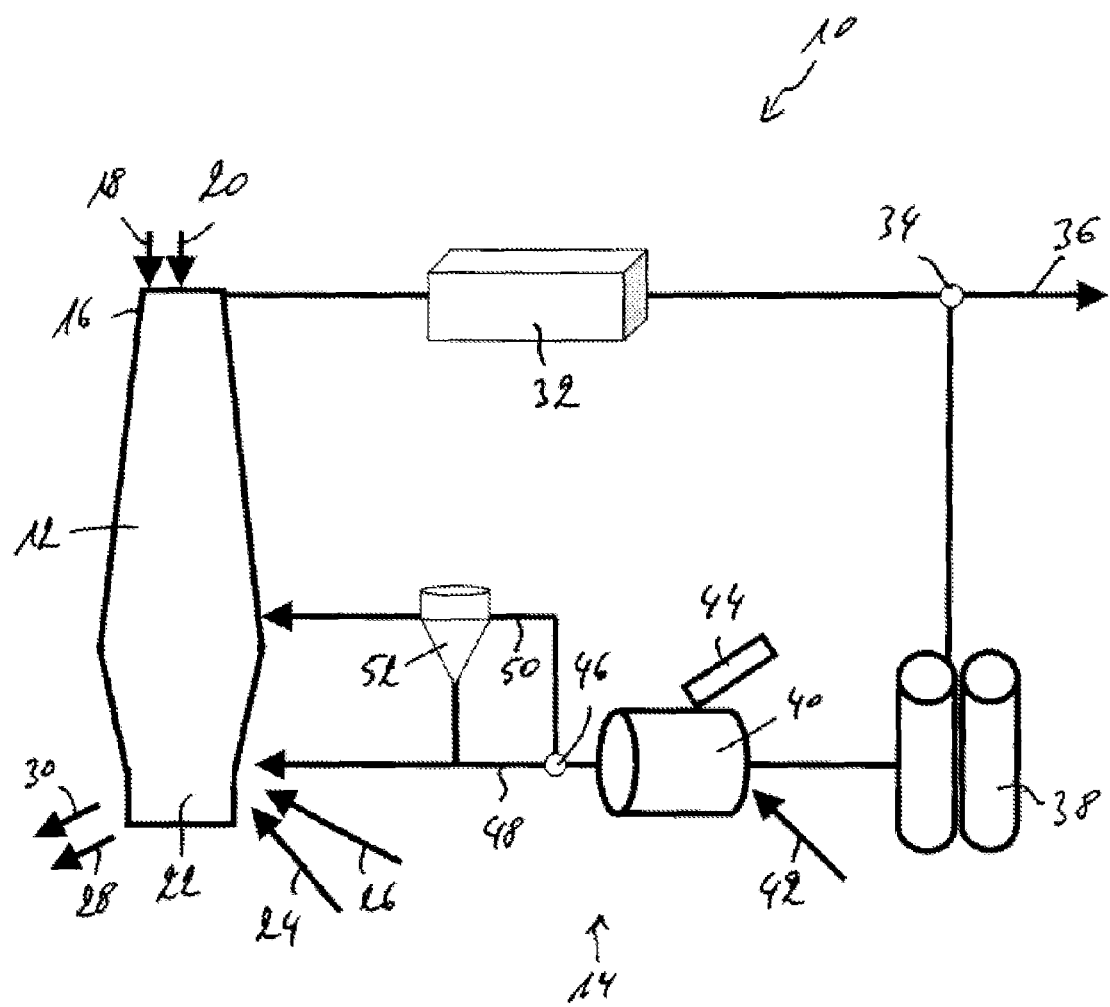

METHOD FOR OPERATING A BLAST FURNACE AND BLAST FURNACE INSTALLATION

TECHNICAL FIELD

The present invention generally relates to a method for operating a blast furnace, in particular for recycling top gas. The invention further relates to a blast furnace installation, in particular comprising a top gas recycling installation.

BACKGROUND

For many years, attempts have been made to reduce $CO_2$ emissions from blast furnaces so as to contribute to the general worldwide reduction of $CO_2$ emissions.

Mainly in order to reduce the amount of coke used, a suggestion was made to recover the top gas from the blast furnace and to inject it back into the blast furnace to aid the reduction process. Devices have been proposed for separating the recovered top gas into a $CO_2$ rich gas for use or storage elsewhere and a $CO_2$ poor gas for injection back into the blast furnace so as to allow the reduction of coke.

Top gas can be reformed by reducing its $CO_2$ content, e.g. by a method wherein fossil fuel is added to the top gas to partially convert carbon dioxide and steam to form carbon monoxide and hydrogen, as suggested in U.S. Pat. No. 3,884,677. This process requires the top gas to be heated to a very high temperature, i.e. in the region of 1,800 to 2,000° C. in order to react with the fossil fuel and break down carbon dioxide. Partial burning of the top gas is necessary to achieve the required temperature.

A nowadays more generally accepted method for reducing the $CO_2$ content in the top gas is by Pressure Swing Adsorption (PSA) or Vacuum Pressure Swing Adsorption (VPSA), as e.g. shown in U.S. Pat. No. 6,478,841. PSA/VPSA installations produce a first stream of gas which is rich in CO and $H_2$ and a second stream of gas rich in $CO_2$ and $H_2O$. The first stream of gas is used as reduction gas and injected back into the blast furnace. The second stream of gas is removed from the installation and, after extraction of the remaining calorific value, disposed of. This disposal controversially consists in pumping the $CO_2$ rich gas into pockets underground for storage. Furthermore, although PSA/VPSA installations allow a considerable reduction of $CO_2$ content in the top gas from about 35% to about 5%, they are very expensive to acquire, to maintain and to operate and they need a lot of space.

BRIEF SUMMARY

The invention provides an improved method for operating a blast furnace. The invention further provides an improved blast furnace installation.

The present invention proposes a method for operating a blast furnace comprising the steps of recovering top gas from the blast furnace; submitting at least a portion of the top gas to a recycling process; and feeding the recycled top gas back into the blast furnace. According to an important aspect of the invention, the recycling process comprises feeding the recovered top gas to a reformer unit; feeding volatile carbon containing material to the reformer unit; proceeding to flash gasification of said volatile carbon containing material in said reformer unit, at a temperature between 1100 and 1300° C., and thereby producing devolatised carbonaceous material and synthesis gas; and allowing the devolatised carbonaceous material and the synthesis gas to react with the recovered top gas.

The mixing of the recovered top gas with devolatised carbonaceous material allows reducing the $CO_2$ content in the top gas, while the synthesis gas allows increasing the available gas volume. Indeed, when the volatile carbon containing material enters the reformer unit into which the recovered top gas is fed, the volatile carbon containing material is subjected to flash gasification, or partial devolatisation, due to the high temperature reigning in the reformer unit. Due to the flash gasification, the amount of volatile content of the volatile carbon containing material being liberated in the form of synthesis gas is significantly higher than the standard predetermined amount for the same volatile carbon containing material. Indeed, for a volatile coal having 35% volatile matter, up to 50% or more volatile matter can be extracted by using flash gasification. In general, up to 1.5 times the standard predetermined amount may be achieved. The higher amount of liberated volatile content leads to the production of more synthesis gas, which in turn leads to an increase in gas volume. At the same time, the remaining carbon of the devolatised carbonaceous material reacts with the carbon dioxide in the top gas and converts the carbon dioxide to carbon monoxide according to the reaction $CO_2 + C \rightarrow 2CO$. A considerable amount of carbon dioxide can, through this process, be converted into carbon monoxide.

A $CO_2$ reduction, similar to that achieved by PSA/VPSA installations, can be achieved, i.e. the $CO_2$ content can be reduced from 35-40% to 4-8%. However, the installation needed to carry out the present method is considerably cheaper than a PSA/VPSA installation; it is not only cheaper in the acquisition of the installation, but also in its maintenance and running.

Furthermore, as only part of the recovered top gas is reformed and injected back into the blast furnace, the remainder of the recovered top gas is transported away from the installation and is used elsewhere; in particular, the calorific value thereof is extracted. The calorific value of the recovered top gas is considerably higher than the calorific value of the $CO_2$ containing gas of the PSA/VPSA installation. The increase of gas volume in the reformer unit further increases the amount of top gas rich in calorific value that can be extracted from the installation.

It should be noted that the volatile carbon containing material fed into the reformer unit is preferably in a solid state. Upon entry into the reformer unit, the volatile carbon containing material is then transformed into devolatised carbonaceous material and synthesis gas.

The volatile carbon containing material is, upon entry into the reformer unit, preferably heated at a rate exceeding 1,000° C. per second, more preferably at a rate exceeding 5,000° C. per second. It should be noted that the rate of heating depends on the diameter of the particles of volatile carbon containing material introduced into the reformer unit. For a particle of about 100 micron diameter, the rate of heating may be in the region of about 10,000° C. per second.

The recovered top gas is advantageously heated to a temperature between 1,100 and 1,300° C., preferably about 1,250° C.

The recovered top gas may for example be heated upstream of the reformer unit in a hot stove, such as a Cowper, or in a pebble heater, or any high temperature heat exchanger. Alternatively, the recovered top gas may e.g. be heated in the reformer unit itself.

The heating of the recovered top gas can be obtained by feeding oxygen to the recovered top gas, either in the reformer unit, in the hot stove or therebetween. Alternatively, the heating of the recovered top gas may be achieved by means of at least one plasma torch associated with the reformer unit.

Furthermore, it is also possible to first heat the recovered top gas in a hot stove or in a pebble heater upstream of the reformer unit and to subsequently further heat the recovered top gas in the reformer unit. This additional heat allows increasing the temperature in the reformer unit and increases devolatisation of the volatile carbon containing material and the conversion of carbon dioxide to carbon monoxide. As a consequence, this produces more gas in which the remaining carbon dioxide is diluted. More importantly however, this also increases the conversion rate of carbon dioxide, thereby further reducing the amount of carbon dioxide in the gas exiting the reformer unit. The hot stove or pebble heater may e.g. be heated using the top gas rich in calorific value extracted from the blast furnace.

In the context of the present invention, volatile carbon containing material is understood to have a calorific power of at least 15 MJ/kg and to comprise volatile coal, volatile plastic material or a mixture thereof. Other volatile carbon containing material may however also be envisaged.

Preferably, volatile coal is understood to be a coal comprising at least 25% of volatile materials. Advantageously, the volatile coal is highly volatile coal comprising at least 30% of volatile materials. The volatile coal injected into the reformer unit may e.g. comprise about 35% of volatile materials. It should be noted that the percentage of volatile materials is preferably as high as possible and that the above percentage indications are in no way intended to indicate an upper limit for the volatile material content. It should also be noted that the coal particles entrained by the reformed top gas exiting the reformer unit form a semi coke that is fed into the blast furnace. Due to the additional semi coke introduced, the amount of coke fed to the blast furnace via its top end can be reduced.

Preferably, volatile plastic material is understood to be a plastic material comprising at least 50% of volatile materials. The plastic material may e.g. comprise automobile shredder residue. It should be noted that the percentage of volatile materials is preferably as high as possible and that the above percentage indications are in no way intended to indicate an upper limit for the volatile material content.

Advantageously, the volatile carbon containing material is ground and/or dried before being injected into the reformer unit in order to facilitate the devolatisation of the volatile carbon containing material in the reformer unit.

According to one embodiment of the invention, the top gas exiting the reformer unit is injected back into the blast furnace at a hearth tuyere level of the blast furnace.

According to another embodiment of the invention, the top gas exiting the reformer unit is divided into a first stream and a second stream of recycled top gas and wherein the first stream of recycled top gas is injected back into the shaft furnace at hearth tuyere level of the blast furnace and the second stream of recycled top gas is injected back into the blast furnace at a location of the blast furnace above the melting zone.

Carbon containing particles are preferably transferred from the second stream of recycled top gas to the first stream of recycled top gas. Such a transfer of carbon containing particles from the second to the first stream of recycled top gas is e.g. carried out by means of a cyclone. Indeed, because the conditions in the shaft of the blast furnace do not allow the introduction of fine particles, it is preferable to remove the carbon containing particles from the second stream and introduce them into the first stream, where they will be injected into the hearth of the blast furnace and burnt.

The present invention also concerns a blast furnace installation comprising a blast furnace; and a top gas recycling installation for recovering top gas from the blast furnace, submitting at least a portion of the top gas to a recycling process and feeding the recycled top gas back into the blast furnace. According to an important aspect of the invention, the top gas recycling installation is configured to carry out the method as described above.

BRIEF DESCRIPTION OF THE DRAWINGS

Preferred embodiments of the invention will now be described, by way of example, with reference to the accompanying drawing, in which:

FIG. 1 is a schematic view of a blast furnace installation according to the invention, comprising a blast furnace and a top gas recycling installation.

DETAILED DESCRIPTION

FIG. 1 generally shows a blast furnace installation 10 comprising a blast furnace 12 and a top gas recycling installation 14. The top end 16 of the blast furnace 12 generally receives a charge of coke 18 and a charge of ore 20, while the bottom end 22 of the blast furnace 12 generally receives fuel 24 and oxygen 26. At the bottom end 22, pig iron 28 and slag 30 is extracted from the blast furnace 12. The operation of the blast furnace itself is well known and will not be further described herein.

The top gas recycling installation 14 comprises means for recovering top gas from the blast furnace, for treating the recovered top gas and for injecting the treated top gas back into the blast furnace. The top gas recycling installation 14 is more closely described herebelow.

The blast furnace top gas is recovered from the top end 16 of the blast furnace 12 and first fed through a gas cleaner unit 32, wherein the amount of dust or foreign particles is reduced.

After passing through the gas cleaner unit 32, the top gas is fed to a first distribution valve 34, which allows only a predetermined amount of gas to remain in the top gas recycling installation 14 to be injected back into the blast furnace 12. Excess top gas 36 is discharged away from the blast furnace installation 10 and may be used in other applications. In particular, the excess top gas 36 may be used for heating other installations.

From the first distribution valve 34, a predetermined amount of top gas is sent through Cowper heaters 38, wherein the top gas is heated to a temperature in the range of 1,100 to 1,300° C., preferably 1,250° C.

The heated top gas is then fed to a reformer unit 40 where in the top gas is treated. Apart from the heated top gas, highly volatile carbon containing material 42 is injected into the reformer unit 40. In the top gas recycling mode, the blast furnace top gas generally comprises between 35 and 40% of carbon dioxide $CO_2$. Due to the high temperature of the top gas, the highly volatile carbon containing material 42 releases its volatile content in the form of synthesis gas, leaving behind the devolatised carbonaceous material, which interacts with the carbon dioxide of the top gas, mainly according to the formula $CO_2 + C \rightarrow 2CO$. A considerable amount of carbon dioxide can, through this process, be converted into carbon monoxide. Applicant has calculated that this process allows a $CO_2$ reduction from the above 35-40% to 4-8%.

According to a preferred embodiment, the reformer unit 40 is further heated so as to facilitate the devolatisation of the volatile carbon containing material and the conversion of carbon dioxide into carbon monoxide. Plasma torches, one of which is represented under reference sign 44 may e.g. be provided for furnishing this additional heat. Other means for furnishing this additional heat is at least one oxygen feed pipe (not shown), for feeding oxygen into the stream of reformed top gas in the Cowper heaters 38, the reformer unit 40 or therebetween.

The above process not only leads to an increase in carbon monoxide in the top gas but also to an increase in hydrogen ($H_2$). Indeed, the synthesis gas produced by the flash gasification of said volatile carbon containing material increases the available gas volume. Due to this gas volume increase in the reformer unit 40, the first distribution valve 34 is controlled such that amount of reformed top gas exiting the reformer unit 40 corresponds to the desired amount of gas to be blown back into the blast furnace 12.

In case of the volatile carbon containing material being volatile coal, the carbon containing particles, or coal particles, entrained by the reformed top gas exiting the reformer unit 40 forms a semi coke that is fed into the blast furnace. Due to the additional reductants (reformed top gas and semi coke) introduced, the amount of coke fed to the blast furnace 12 via its top end 16 can be reduced.

Downstream of the reformer unit 40, a second distribution valve 46 is arranged for dividing the reformed top gas exiting the reformer unit 40 into a first stream 48 of reformed top gas and a second stream 50 of reformed top gas.

The first stream 48 is directed back into the blast furnace 12 through the tuyeres (not represented) into the hearth of the blast furnace 12. The second stream 50 is blown into the stack of the blast furnace 12, directly above the melting zone of the charge.

Before the second stream 50 is blown into the blast furnace 12 it is directed through a cyclone 52 in order to remove a substantial part of the carbon containing particles from the second stream 50. Within the cyclone 52, the carbon containing particles are directed towards the outer wall region of the cyclone, while the gas in the central section has reduced carbon containing particle content. The gas from this central section is kept in the second stream 50 and blown into the stack of the blast furnace 12, while the carbon containing particles are directed from the outer wall region of the cyclone to the first stream 48. Hence, the first stream 48 comprises a reformed top gas rich in carbon containing particles, whereas the second stream 50 comprises a reformed top gas poor in carbon containing particles. Indeed, it is preferred that the gas injected into the stack of the blast furnace has poor carbon containing content because the conditions in the upper portion of the blast furnace do not allow the injection of fine particles.

The invention claimed is:

1. A method for operating a blast furnace comprising the steps of:
   recovering top gas from said blast furnace;
   submitting at least a portion of said top gas to a recycling process; and
   feeding said recycled top gas back into said blast furnace characterised in that said recycling process comprises:
   feeding the recovered top gas to a reformer unit;
   feeding volatile carbon containing material to said reformer unit;
   proceeding to flash gasification of said volatile carbon containing material in said reformer unit, at a temperature between 1,100 and 1,300° C., and thereby producing devolatised carbonaceous material and synthesis gas; and
   allowing said devolatised carbonaceous material and said synthesis gas to react with said recovered top gas.

2. The method according to claim 1, wherein said volatile carbon containing material is fed into said reformer unit in a solid state, wherein upon entry into the reformer unit said volatile carbon containing material is transformed into devolatised carbonaceous material and synthesis gas.

3. The method according to claim 1, wherein said volatile carbon containing material is, upon entry into the reformer unit, heated at a rate exceeding 1,000° C. per second.

4. The method according to claim 1, wherein said recovered top gas is heated to a temperature between 1,100 and 1,300° C. in or upstream of said reformer unit.

5. The method according to claim 4, wherein said recovered top gas is heated to a temperature of about 1,250° C. in or upstream of said reformer unit.

6. The method according to claim 1, wherein said recovered top gas is heated upstream of said reformer unit in a hot stove, a pebble heater or any high temperature heat exchanger.

7. The method according to claim 1, wherein said recovered top gas is heated in said reformer unit.

8. The method according to claim 7, wherein said recovered top gas is heated in said reformer unit by means of at least one plasma torch and or by means of oxygen injection into the stream of recovered top gas.

9. The method according claim 1, wherein said volatile carbon containing material comprises volatile coal with at least 25% of volatile materials.

10. The method according to claim 1, wherein said volatile carbon containing material comprises volatile plastic material with at least 50% of volatile materials.

11. The method according to claim 1, wherein said volatile carbon containing material has a calorific power of at least 15 MJ/kg.

12. The method according to claim 1, wherein said volatile carbon containing material is ground and/or dried before being injected into said reformer unit.

13. The method according to claim 1, wherein said top gas exiting the reformer unit is injected back into said blast furnace at a hearth tuyere level of the blast furnace.

14. The method according to claim 1, wherein said top gas exiting the reformer unit is divided into a first stream and a second stream of recycled top gas and wherein said first stream of recycled top gas is injected back into said blast furnace at hearth tuyere level of the blast furnace and said second stream of recycled top gas is injected back into said blast furnace at a location of the blast furnace above the melting zone.

15. The method according to claim 14, wherein carbon containing particles are transferred from said second stream of recycled top gas to said first stream of recycled top gas.

16. The method according to claim 15, wherein the transfer of carbon containing particles from said second to said first stream of recycled top gas is carried out by means of a cyclone.

17. The method according to claim 1, wherein said volatile carbon containing material is, upon entry into the reformer unit, heated at a rate between 5,000 and 10,000° C. per second.

18. The method according to claim 1, wherein said volatile carbon containing material comprises volatile coal with at least 30% of volatile materials.

19. The method according to claim 1, wherein said volatile carbon containing material comprises volatile coal with about 35% of volatile materials.

* * * * *